United States Patent
Graz et al.

(10) Patent No.: US 12,053,003 B2
(45) Date of Patent: Aug. 6, 2024

(54) ANIMAL FEED SUPPLEMENT

(71) Applicant: MOOTRAL SA, Rolle (CH)

(72) Inventors: Carl Jorg Michael Graz, Abertillery Blaenau Gwent (GB); Albrecht Joerg Matthias Miller, Abertillery Blaenau Gwent (GB)

(73) Assignee: MOTTRAL SA, Rolle (CH)

( * ) Notice: Subject to any disclaimer, the term of this patent is extended or adjusted under 35 U.S.C. 154(b) by 1001 days.

(21) Appl. No.: 16/617,867

(22) PCT Filed: Jan. 4, 2018

(86) PCT No.: PCT/GB2018/050010
§ 371 (c)(1),
(2) Date: Nov. 27, 2019

(87) PCT Pub. No.: WO2018/220340
PCT Pub. Date: Dec. 6, 2018

(65) Prior Publication Data
US 2020/0138056 A1    May 7, 2020

Related U.S. Application Data

(63) Continuation of application No. PCT/GB2017/051562, filed on Jun. 1, 2017.

(51) Int. Cl.
| | |
|---|---|
| *A23K 20/111* | (2016.01) |
| *A23K 10/30* | (2016.01) |
| *A23K 20/105* | (2016.01) |
| *A23K 20/121* | (2016.01) |
| *A23K 50/10* | (2016.01) |

(52) U.S. Cl.
CPC ............ *A23K 20/111* (2016.05); *A23K 10/30* (2016.05); *A23K 20/105* (2016.05); *A23K 20/121* (2016.05); *A23K 50/10* (2016.05)

(58) Field of Classification Search
CPC ...... A23K 20/111; A23K 50/10; A23K 10/30; A23K 20/105; A23K 20/121
See application file for complete search history.

(56) References Cited

U.S. PATENT DOCUMENTS

| | | | |
|---|---|---|---|
| 6,068,862 A | 5/2000 | Ishihara et al. | |
| 2009/0285931 A1 | 11/2009 | Shelby et al. | |
| 2012/0171323 A1* | 7/2012 | Bravo .................. | A23K 20/111 426/655 |
| 2013/0040902 A1 | 2/2013 | Miron et al. | |
| 2013/0123207 A1 | 5/2013 | Sardi | |
| 2014/0088161 A1* | 3/2014 | Duval .................... | A61K 31/23 514/460 |
| 2015/0132432 A1* | 5/2015 | Balcells ............... | A23K 20/163 426/2 |

FOREIGN PATENT DOCUMENTS

| | | | | |
|---|---|---|---|---|
| CN | 103564213 A | 2/2014 | | |
| CN | 104244730 A | 12/2014 | | |
| CN | 104431504 A | 3/2015 | | |
| CN | 106260724 A | 1/2017 | | |
| CN | 106578559 A | 4/2017 | | |
| CN | 106721643 A | 5/2017 | | |
| JP | 2015514409 | 5/2015 | | |
| WO | WO 03/004668 A1 | 1/2003 | | |
| WO | WO-2014013068 A1 * | 1/2014 | ............. | A23K 20/10 |
| WO | WO 2016/102931 A1 | 6/2016 | | |
| WO | WO 2018/220338 | 12/2018 | | |
| WO | WO 2022/136857 | 6/2022 | | |

OTHER PUBLICATIONS

Hernandez, A., et al., "The effect of garlic oil, xylanase enzyme and yeast on biomethane and carbon dioxide production from 60-d old Holstein dairy calves fed a high concentrate diet," J. of Cleaner Production, Nov. 8, 2016, vol. 142, pp. 2384-2392.

Sudipta, G., et al., "The effect of dietary garlic supplementation on body weight gain, feed intake, feed conversion efficiency, faecal score, faecal coliform count and feeding cost in crossbred dairy calves," Tropical Animal Health and Production, Kluwer Academic Publishers, DO, Dec. 9, 2009, vol. 42, No. 5, pp. 961-968.

Patra, A. K., et al., "A new perspective on the use of plant secondary metabolities to inhibit methanogenesis in the rumen," Phytochemistry, Pergamon Press, GB, Aug. 1, 2010, vol. 71, No. 11-12, pp. 1198-1222.

Garcia-Gonzalez, R., et al., "Screening the activity of plants and spices for decreasing ruminal methane production in vitro," Animal Feed Science and Technology, Elsevier, Amsterdam, NL, Nov. 14, 2008, vol. 147, No. 1-3, pp. 36-52.

Busquet, M., et al., "Effects of Cinnamaldehyde and Garlic Oil on Rumen Microbial Fermentation in a Dual Flow Continuous Culture," J of Dairy Science, American Dairy Science Assoc., US, Jul. 1, 2005, vol. 88, No. 7, pp. 2508-2516.

Calsamiglia, S., et al., "Invited Reveiw: Essential Oils and Modifiers of Rumen Microbial Fermentation," J of Dairy Science, American Dairy Science Assoc., US, Jun. 1, 2007, vol. 90, No. 6, pp. 2580-2595.

Celia, C., et al., "Effect of pre- and post-weaning dietary supplementation with Digestarom herbal formulation on rabbit carcass traits and meat quality," Meat Science, Mar. 31, 2016, vol. 118, pp. 89-95.

EPO (Riswijk, NL), English language verison of the International Search Report, Form PCT/ISA/210, for International Application PCT/GB2018/050010, Mar. 16, 2018 (5 pages).

(Continued)

*Primary Examiner* — Jeffrey P Mornhinweg
(74) *Attorney, Agent, or Firm* — Pauley Erickson & Swanson

(57) ABSTRACT

An animal feed supplement and an animal feed composition including said animal feed supplement, and methods of making and using said animal feed supplement and animal feed composition. The animal feed supplement includes at least one organosulfur compound and at least one phenolic compound.

18 Claims, No Drawings

(56) References Cited

OTHER PUBLICATIONS

Peterson, J. J. et al., "Flavanones in oranges, tangerines (mandarins), tangors, and tangelos: a compilation and review of the data from the analytical literature", Journal of Food Composition and Analysis. Jan. 2006, vol. 19, pp. S66-S73.

Peterson, J. J. et al., "Flavanones in grapefruit, lemons, and limes: A compilation and review of the data from the analytical literature", Journal of Food Composition and Analysis. Jan. 2006, vol. 19, pp. S74-S80.

Zhao Tiantao et al., "Greenhouse Effect—Depression? Gesitation? Lost hope?—Metallurgical Industry Press", pp. 117-118, published on Jul. 31, 2012. (Abstract).

Lanzotti, V. (Jan. 2006). "The analysis of onion and garlic", Journal of chromatography A, 1112(1-2), 3-22.

Pascoal, L.M. et al., "Analysis of the chemical composition of the essential oil of garlic bulb (*Allium sativum*)"—57th Brazilian Congress of Chemistry—Gramado—RS**—https://www.abq.org.br/cbq/2017/trabalhos/7/11284-21388.html#%3A~%3Atext%3DNa%20avalia%C3%A7%C3%A30%20da%20composi%C3%A7%C3%A3o%20do%2Cmol%C3%A9cula%20bioativa%20presente%20no%20alho (Oct. 2017).

\* cited by examiner

ANIMAL FEED SUPPLEMENT

TECHNICAL FIELD

The present invention relates generally to an animal feed supplement comprising at least one organosulfur compound and at least one phenolic compound (e.g. at least one bioflavonoid). The present invention further relates to animal feed compositions comprising said animal feed supplement. The present invention also relates to the various uses of said animal feed supplement and animal feed composition and to methods of making said animal feed supplement and animal feed compositions.

BACKGROUND

Livestock emissions are responsible for about 15% of all global greenhouse gas emissions and are the third largest contributor of greenhouse gases after energy and industry. The negative effect of methane on the climate is about 21 times higher than the effect of carbon dioxide. On average, a cow releases between 85 and 170 kg of methane per year.

Particular types of microbes in the gut of ruminant animals use nutrients consumed by the animal to produce methane as a by-product. In addition to the negative effects of methane on climate change, this also reduces the nutrients available for use by the animal.

It is therefore desirable to provide alternative and/or improved compositions to reduce methane production and/or increase availability of nutrients to an animal.

SUMMARY

In accordance with a first aspect of the present invention there is provided an animal feed supplement comprising at least one organosulfur compound and at least one phenolic compound. The at least one phenolic compound may, for example, be at least one bioflavonoid.

In accordance with a second aspect of the present invention there is provided an animal feed composition comprising an animal feed supplement according to any aspect or embodiment of the present invention.

In accordance with a third aspect of the present invention there is provided a use of an animal feed supplement or animal feed composition according to any aspect or embodiment of the present invention to reduce methane production by an animal. As such, there is also provided a method for reducing methane production by an animal, the method comprising administering an animal feed supplement or animal feed composition according to any aspect or embodiment of the present invention to the animal.

In accordance with a fourth aspect of the present invention there is provided a use of an animal feed supplement or animal feed composition according to any aspect or embodiment of the present invention to increase and/or increase efficiency of milk and/or meat and/or wool production by an animal. As such, there is also provided a method for increasing and/or increasing efficiency of milk and/or meat and/or wool production by an animal, the method comprising administering an animal feed supplement or an animal feed composition according to any aspect or embodiment of the present invention to the animal.

In accordance with a fifth aspect of the present invention there is provided a use of an animal feed supplement or animal feed composition according to any aspect or embodiment of the present invention to increase availability of nutrients to an animal. As such, there is also provided a method for increasing availability of nutrients to an animal, the method comprising administering an animal feed supplement or an animal feed composition according to any aspect or embodiment of the present invention to the animal.

In accordance with a sixth aspect of the present invention there is provided a method for making an animal feed supplement according to any aspect or embodiment of the present invention, the method comprising combining at least one organosulfur compound and at least one phenolic compound. The at least one phenolic compound may be at least one bioflavonoid.

In accordance with a seventh aspect of the present invention there is provided a method for making an animal feed composition according to any aspect or embodiment of the present invention, the method comprising combining an animal feed with at least one organosulfur compound and at least one phenolic compound. The at least one phenolic compound may be at least one bioflavonoid.

The uses and methods described herein are considered to be purely non-therapeutic. However, to the extent that any of the uses and methods described herein are considered to be therapeutic, the therapeutic uses and methods and animal feed supplements and animal feed compositions for use in said therapeutic uses and methods are also provided as further aspects of the present invention.

In certain embodiments of any aspect of the present invention, the at least one organosulfur compound is or includes allicin.

In certain embodiments of any aspect of the present invention, the at least one phenolic compound comprises at least one bioflavonoid. In certain embodiments of any aspect of the present invention, the at least one phenolic compound is selected from the group consisting of bioflavonoids, non-bioflavonoid phenolic compounds and combinations of one or more thereof.

In certain embodiments of any aspect of the present invention, each of the one or more bioflavonoids is independently selected from anthoxanthins, flavanones (including flavanone glycosides), flavonols, flavanonols, flavans, isoflavones, anthocyanidins and proanthocyanidins. In certain embodiments, each of the one or more bioflavonoids is independently selected from anthoxanthins and flavanones (including flavanone glycosides).

In certain embodiments of any aspect of the present invention the one or more bioflavonoid is selected from the group consisting of naringin, neohesperidin, eriocitrin, isonaringin, naringenin, hesperidin, roifolin, diosmin, didymin, hesperetin, poncirin, catechin, rutin, acacetin, genistein, kaempferol, quercetin, epicatechin, gallocatechin, epigallocatechin, catechin gallate, epicatechin gallate, epigallocatechin gallate and gallocatechin gallate. In certain embodiments, the one or more bioflavonoid is/are selected from naringin and neohesperidin. In certain embodiments, the one or more bioflavonoid is naringin, neohesperidin or a combination thereof. In certain embodiments, the one or more bioflavonoid is/are selected from the group consisting of catechin, rutin, acacetin, genistein, kaempferol, gallocatechin, catechin gallate, gallocathecin gallate, epicatechin, epigallocatechin, epicatechin gallate, epigallocathecin gallate, quercetin and a combination of one or more thereof. In certain embodiments, the one or more bioflavonoid is/are selected from catechin, rutin, acacetin, genistein, kaempferol, gallocatechin, catechin gallate, epicatechin, epigallocatechin, epicatechin gallate and quercetin. In certain embodiments, the one or more bioflavonoid is/are selected from the group consisting of catechin, rutin, acacetin, genistein, kaempferol and a combination of one or more thereof. In certain embodiments, the one or more bioflavonoid is/are selected from catechin, rutin, acacetin, genistein and kaempferol. In certain embodiments, the one or more bioflavonoid is/are selected from gallocatechin, catechin gallate, gallocathecin gallate, epicatechin, epigallocatechin, epicatechin gallate, epigallocathecin gallate, kaempferol, quercetin and a combination of one or more thereof. In certain embodiments, the one or more bioflavonoid is/are selected from gallocatechin, catechin gallate, epicatechin, epigallocatechin, epicatechin gallate, kaempferol and quercetin.

In certain embodiments of any aspect of the present invention, each of the one or more non-bioflavonoid phenolic compounds is independently selected from phenolic acid, hydroxycinnamic acids, coumarins, stilbenoids, anthraquinones, lignans, lignins, tannins, polyphenolic proteins and polyphenols.

In certain embodiments of any aspect of the present invention, each of the one or more non-bioflavonoid phenolic compounds is independently selected from coumaric acid, cinnamic acid, gallic acid, ellagic acid, protocathechuic acid, chlorogenic acid, caffeic acid, ferullic acid, punicalagin and punicalin.

In certain embodiments of any aspect of the present invention, the animal feed supplement or animal feed composition comprises two or more phenolic compounds, for example two or more bioflavonoids. In certain embodiments, the animal feed supplement or animal feed composition comprises two phenolic compounds, for example two bioflavonoids. In certain embodiments, the animal feed supplement or animal feed composition comprises naringin and neohesperidin. In certain embodiments, the animal feed supplement or animal feed comprises five phenolic compounds, for example five bioflavonoids. In certain embodiments, the animal feed supplement or animal feed comprises catechin, rutin, acacetin, genistein and kaempferol. In certain embodiments, the animal feed supplement or animal feed comprises seven phenolic compounds, for example seven bioflavonoids. In certain embodiments, the animal feed supplement or animal feed comprises gallocatechin, catechin gallate, epicatechin, epigallocatechin, epicatechin gallate, kaempferol and quercetin. In certain embodiments, the animal feed supplement or animal feed comprises nine phenolic compounds, for example nine bioflavanoids. In certain embodiments, the animal feed supplement or animal feed composition comprises gallocatechin, catechin gallate, gallocathecin gallate, epicatechin, epigallocatechin, epicatechin gallate, epigallocathecin gallate, kaempferol and quercetin. In certain embodiments, the animal feed supplement or animal feed composition comprises eleven phenolic compounds. In certain embodiments, the animal feed supplement or animal feed composition comprises catechin, rutin, acacetin, genistein, kaempferol, coumaric acid, cinnamic acid, gallic acid, ellagic acid, punicalagin and punicalin.

In certain embodiments of any aspect of the present invention, the animal is a ruminant animal or a pseudo-ruminant animal.

Embodiments of the invention will be further described in the detailed description. Any embodiment described herein or any combination of embodiments described herein is applicable to any one or more aspect of the present invention unless clearly contradicted by context.

DETAILED DESCRIPTION

The present invention is based, at least one part, on the surprising finding that a combination of at least one organo-sulfur compound and at least one phenolic compound such as at least one bioflavonoid can reduce methane production and/or emissions by animals such as ruminant animals. The at least one phenolic compound may, for example, comprise bioflavonoid(s), non-bioflavonoid phenolic compound(s) or a combination thereof.

Hereinafter, the invention shall be described according to preferred embodiments of the present invention and by referring to the accompanying description. However, it is to be understood that limiting the description to the preferred embodiments of the invention is merely to facilitate discussion of the present invention and it is envisioned that those skilled in the art may devise various modifications without departing from the scope of the appended claims.

The terms generally used hereinbefore and hereinafter have for preference the meanings indicated below, unless indicated otherwise, whereby more specific meanings may be used independently of one another in preferred embodiments of the present inventions instead of the general definitions, these more specific significances describing especially preferred embodiments of the invention.

Where the term "at least one" or "one or more" occurs hereinbefore and hereinafter, this signifies in particular one to twenty or one to ten, for preference one to five or one to three, and in particular one or, further, two of the features enumerated, such as components. Where ranges are indicated, such as weight percentage ranges, these include the limit values indicated; thus, for example, "between X and Y" signifies "from and including X up to and including Y".

The term "product" or "composition" may refer to a pharmaceutical, nutraceutical or cosmetic product or composition. The product or composition may, for example, be a solid (e.g. powder, granules, pellets), semi-solid (e.g. gel, ointment, cream, paste) or liquid (e.g. solutions, suspensions, emulsions) product or composition.

The term "therapeutic treatment" or "therapeutic method", also includes prophylaxis and the alleviation of symptoms of a disease and/or disorder in a subject, although not cosmetic treatments. The expression "treating or preventing" and analogous terms used herein refers to all forms of healthcare intended to remove or avoid the disease and/or disorder or to relieve its symptoms, including preventive and curative care, as judged according to any of the tests available according to the prevailing medical practice. An intervention that aims with reasonable expectation to achieve a particular result but does not always do so is included within the expression "treating or preventing". An intervention that succeeds in slowing or halting progression of a disease and/or disorder is included within the expression "treating or preventing".

The term "nutraceutical" refers to a food or part of a food that includes, but is not limited to, dietary supplements, functional foods and medicinal foods. A "nutraceutical" can be used in a therapeutic treatment and/or non-therapeutic treatment depending on the desires and/or needs of a subject.

The term "consisting of" may, for example, exclude any additional element, step or ingredient not explicitly recited.

The term "consisting essentially of" may, for example, exclude any additional element, step or ingredient not explicitly recited unless the additional element, step or ingredient does not materially affect the basic and novel properties of the invention. Where the one or more additional element(s), step(s) or ingredient(s) is/are one or more additional component(s) of a composition, the total amount of the additional component(s) in the composition may, for example, be limited to 20 wt %. For example, the total amount of the additional component(s) in the composition may be limited to 19 wt % or 18 wt % or 17 wt % or 16 wt % or 15 wt % or 14 wt % or 13 wt % or 12 wt % or 11 wt % or 10 wt % or 9 wt % or 8 wt % or 7 wt % or 6 wt % or 5 wt % or 4 wt % or 3 wt % or 2 wt % or 1 wt %.

Animal Feed Supplement

There is provided herein an animal feed supplement comprising at least one organosulfur compound and at least one phenolic compound, such as at least one bioflavonoid. The term "supplement" refers to a product or composition, which may, for example, be a solid (e.g. powder, granules, pellets), semi-solid (e.g. gel, ointment, cream, paste) or liquid product (e.g. solutions, suspensions, emulsions) or composition, that is suitable for and/or intended for addition to animal feed in order to provide one or more beneficial effects. However, the animal feed supplement is not sufficient on its own to meet the nutritional need of the animal. The animal feed supplement and the various components of the animal feed supplement may, for example, be present in various concentrations and may, for example, be diluted upon addition to the animal feed composition. Although it may be preferred that the animal feed supplement is consumed by the animal together with its usual animal feed, the animal feed supplement may also be consumed by the animal separately to any animal feed, for example as a liquid (e.g. diluted in water) or in the form of a bolus or tablet.

The animal feed supplements and animal feed compositions described herein comprise one or more organosulfur compounds. For example, the animal feed supplements and animal feed compositions may comprise two or more organosulfur compounds or three or more organosulfur compounds or four or more organosulfur compounds or five or more organosulfur compounds. For example, the animal feed supplements and animal feed compositions may comprise one, two, three, four or five bioflavonoids. For example, the animal feed supplements and animal feed compositions may comprise one, two, three, four or five organosulfur compounds For example, the animal feed supplements and animal feed compositions may comprise one organosulfur compound that may be allicin.

Organosulfur compounds are organic compounds that contain sulfur. In certain embodiments, each organosulfur compound may independently be selected from thioethers, thioesters, thioacetals, thiols, disulfides, polysulfides, sulfoxides, sulfones, thiosulfinates, sulfimides, sulfoximides, sulfonediimines, thioketones, thioaldehydes, sulfines, sulfenes, thiocarboxylic acids (including dithiocarboxyklic acids), sulfonic acids, sulfinic acids, sulfenic acids, sulfonic esters, sulfinic esters, sulfenic esters, sulfonic amides, sulfinic amides, sulfenic amides, sulfonium compounds, oxosulfonium compounds, sulfonium ylides, oxosulfonium ylides, thiocarbonyl ylides, sulfuranes and persulfuranes. In certain embodiments, each organosulfur compound is independently selected from thioesters, sulfoxides, thioethers, disulfides, polysulfides (including trisulfides) and thiols. In certain embodiments, each organosulfur compound is independently selected from thioesters, sulfoxides, thioethers, disulfides and polysulfides (including trisulfides).

In certain embodiments, each organosulfur compound is independently selected from allicin, alliin, allylpropyl disulfide, diallyl trisulfide, s-allylcysteine, vinyldithiines (3-vinyl-4H-1,2-dithiin and 2-vinyl-4H-1,3-dithiin) and diallyl disulphide. In certain embodiments, the at least one organosulfur compound is or includes allicin.

Allicin is an organosulfur compound having the chemical formula $C_6H_{10}OS_2$ and structure shown below.

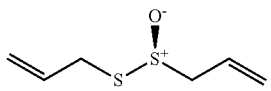

The at least one organosulfur compound such as allicin may, for example, be obtained from garlic or another *Allium* species. For example, the organosulfur compound (e.g. allicin) may be obtained from an extract of an *Allium* species such as garlic (*Allium sativum*). The term extract encompasses aqueous extracts, non-aqueous extracts, alcoholic extracts, concentrates, oils, macerations, powders, granules and combinations of two or more thereof. For example, the organosulfur compound (e.g. allicin) may be obtained from raw garlic, dried garlic or a combination thereof.

The organosulfur compound (e.g. allicin) may, for example, be derived from any of the subspecies and varieties of *Allium* that are currently known or are later discovered, such as garlic (*Allium sativum*), *Allium ursinum*, *Allium fistulosum*, *Allium cepa* and *Allium tricoccum*. For example, the organosulfur compound (e.g. allicin) may independently be derived from garlic of the subspecies *ophioscorodon* (hard neck garlic) and *sativum* (soft neck garlic). For example, the organosulfur compound (e.g. allicin) may independently be derived from porcelain garlics, rocambole garlics, purple stripe garlics, marbled purple stripe garlics, glazed purple stripe garlics, artichoke garlics, silverskin garlics, asiatic garlics, turban garlics and creole garlics. In particular, the organosulfur compound (e.g. allicin) may be obtained from *Allium sativum*.

The *Allium* from which the organosulfur compound (e.g. allicin) may be derived may, for example, have been treated or processed. For example, the *Allium* may be "aged" or "black" (e.g. aged or black garlic), obtained by storing the *Allium* in controlled conditions and heated under specific temperature, humidity and solvents, for example over several days or weeks, to cause the cloves to darken in colour after undergoing Maillard or browning reaction. For example, the *Allium* may be "dried" or "dehydrated", obtained by heating the fresh or non-aged garlic to a temperature of between 30° C. and 120° C. and achieving a moisture content of about 3 to 10%, with or without transforming or converting its constituents into different compounds. For example, the *Allium* may be "fresh" or "non-aged" (e.g. fresh or non-aged garlic), obtained without undergoing special treatment or processing intentionally to transform or convert its constituents into different compounds. The fresh or non-aged *Allium* may, for example, have been treated or processed to remove the odour (deodourised) (e.g. deodourised garlic extract). Generally, an encapsulation or coating process can be applied to mask or reduce the odour. Alternatively or additionally, taste-masking ingredients such as green tea, parsley, basil, spinach etc. can be added to mask or reduce the odour in a composition.

The organosulfur compound (e.g. allicin) may or may not be isolated and/or purified before incorporation into the animal feed supplement and animal feed compositions described herein. As such, in certain embodiments the animal feed supplement or animal feed compositions described herein may comprise raw garlic, dried garlic and/or garlic extracts.

In other embodiments, the organosulfur compound (e.g. allicin) is chemically synthesized. In certain embodiments, allicin may be obtained by treating a natural source of allinase to release allinase, contacting the treated source of allinase with alliin, whereby alliin is enzymatically converted to allicin and optionally extracting the allicin. A suitable method is further described, for example, in WO 03/004668, the contents of which are incorporated herein by reference. In other embodiments, allicin may be completely chemically synthesized.

The term phenolic compound refers to a class of chemical compounds comprising a hydroxyl group (—OH) bonded directly to an aromatic hydrocarbon group. The phenolic compound described herein may comprise bioflavonoids, non-bioflavonoid phenolic compounds or a combination thereof. The at least one phenolic compound may, for example, comprise at least one bioflavonoid.

The term bioflavonoid refers to a class of plant and fungus secondary metabolites and having the general structure of a 15-carbon skeleton consisting of two phenyl rings (A and B) and heterocyclic ring (C), sometimes abbreviated as C6-C3-C6. The term bioflavonoid includes anthoxanthins (including flavones and flavonols), flavanones, flavanonols, flavans and anthocyanidins. The term bioflavonoid also includes compounds having a flavone backbone (2-phenyl-1,4-benzopyrone), an isoflavan backbone (3-phenylchromen-4-one) or a neoflavan backbone (4-phenylcoumarine).

The term non-bioflavonoid phenolic compound refers to other classes of phenolic compounds known in the field that do not fall under the definition of the term bioflavonoid as described herein. The term non-bioflavonoid phenolic compound includes phenolic compounds comprising 6 or more carbons, 7 or more carbons, 8 or more carbons, 9 or more carbons, 10 or more carbons, 13 or more carbons, 14 or more carbons, 16 or more carbons, 18 or more carbons or 30 or more carbons. The term non-bioflavonoid phenolic compound includes but is not limited to phenolic acids (a $C_6$-$C_1$ structure), hydroxycinnamic acids (a $C_6$-$C_3$ structure), coumarins (a $C_6$-$C_3$ structure), stilbenoids (a $C_6$-$C_2$-$C_6$ structure), anthraquinones (a $C_6$-$C_2$-$C_6$ structure) and lignans (a $(C_6$-$C_3)_2$ structure). In some embodiments, the non-bioflavonoid phenolic compounds are plant polymers including but not limited to lignins, catechol melanins, flavolans, polyphenolic proteins and polyphenols. In some embodiments, the non-bioflavonoid phenolic compounds are polyphenols.

In certain embodiments, the one or more bioflavonoids is each independently selected from anthoxanthins (including flavones and flavonols), flavanones (including flavanone glycosides), flavanonols, flavans, isoflavones, anthocyanidins and proanthocyanidins. In certain embodiments, each of the one or more bioflavonoids is independently selected from anthoxanthins and flavanones (including flavanone glycosides). In certain embodiments, all bioflavonoids are anthoxanthins and/or flavanones. In certain embodiments, the one or more bioflavonoid(s) is/are independently a flavone or a flavanone. In certain embodiments, all bioflavonoids are flavones and/or flavanones. The flavones and flavanones may, for example, independently be flavone glycosides and flavanone glycosides respectively. In certain embodiments, the one or more bioflavonoid(s) is/are flavanones. In certain embodiments, all of the bioflavonoid(s) is/are flavanones. In certain embodiments, the one or more bioflavonoid(s) is/are flavanone glycosides. In certain embodiments, all of the bioflavonoid(s) is/are flavanone glycosides.

The one or more bioflavonoid(s) may, for example, be selected from the group consisting of naringin, neohesperidin, eriocitrin, isonaringin, naringenin, hesperidin, roifolin, diosmin, didymin, hesperetin, poncirin, catechin, rutin, acacetin, genistein, kaempferol, quercetin, epicatechin, gallocatechin, epigallocatechin, catechin gallate, epicatechin gallate, epigallocatechin gallate and gallocatechin gallate. In certain embodiments, the one or more bioflavonoid(s) includes naringin and neohesperidin. In certain embodiments, the one or more bioflavonoid(s) is a combination of naringin and neohesperidin. In certain embodiments, the one or more bioflavonoid(s) includes one or more of catechin, rutin, acacetin, genistein, kaempferol, gallocatechin, catechin gallate, epicatechin, epigallocatechin, epicatechin gallate and quercetin. In certain embodiments, the one or more bioflavonoid(s) includes one or more of catechin, rutin, acacetin, genistein and kaempferol. In certain embodiments, the one or more bioflavonoid(s) is a combination of catechin, rutin, acacetin, genistein and kaempferol.

In certain embodiments, the one or more bioflavonoid(s) includes one or more of gallocatechin, catechin gallate, epicatechin, epigallocatechin, epicatechin gallate, gallocathecin gallate, epigalloacathecin gallate, kaempferol and quercetin. In certain embodiments, the one or more bioflavonoid(s) includes one or more of gallocatechin, catechin gallate, epicatechin, epigallocatechin, epicatechin gallate, kaempferol and quercetin. In certain embodiments, the one or more bioflavonoid(s) is a combination of gallocatechin, catechin gallate, epicatechin, epigallocatechin, epicatechin gallate, gallocathecin gallate, epigallocathecin gallate, kaempferol and quercetin. In certain embodiments, the one or more bioflavonoid(s) is a combination of gallocatechin, catechin gallate, epicatechin, epigallocatechin, epicatechin gallate, kaempferol and quercetin.

In certain embodiments, the one or more non-bioflavonoid phenolic compounds is each independently selected from phenolic acids, hydroxycinnamic acids, coumarins, stilbenoids, anthraquinones, lignans, lignins, tannins, polyphenolic proteins and polyphenols. In certain embodiments, each of the one or more non-bioflavonoid phenolic compounds is independently selected from tannins and polyphenols. In certain embodiments, all non-bioflavonoid phenolic compounds are tannins and/or polyphenols.

The one or more non-bioflavonoid phenolic compound(s) may, for example, be selected from the group consisting of coumaric acid, cinnamic acid, gallic acid, ellagic acid, protocathechuic acid, chlorogenic acid, caffeic acid, ferullic acid, punicalagin and punicalin and combinations of two or more thereof. In certain embodiments, the one or more non-bioflavonoid phenolic compound(s) includes one or more of coumaric acid, cinnamic acid, gallic acid, ellagic acid, protocathechuic acid, chlorogenic acid, caffeic acid, ferullic acid, punicalagin and punicalin.

In a preferred embodiment, the mixture of bioflavonoid(s) and non-bioflavonoid phenolic compound(s) may, for example, be selected from the group consisting of naringin, neohesperidin, eriocitrin, isonaringin, naringenin, hesperidin, roifolin, diosmin, didymin, hesperetin, poncirin, catechin, rutin, acacetin, genistein, kaempferol, coumaric acid, cinnamic acid, gallic acid, ellagic acid, protocathechuic acid, chlorogenic acid, caffeic acid, ferullic acid, punicalagin, punicalin gallocatechin, catechin gallate, epicatechin, epigallocatechin, epicatechin gallate, gallocathecin gallate, epigallocathecin gallate, quercetin and a combination of two or more thereof.

The animal feed supplements and animal feed compositions described herein comprise one or more phenolic compounds. For example, the animal feed supplements and animal feed compositions may comprise two or more phenolic compounds or three or more phenolic compounds or four or more phenolic compounds or five or more or six or more or seven or more or eight or more or nine or more or ten or more phenolic compounds. For example, the animal feed supplements and animal feed compositions may comprise one, two, three, four or five phenolic compounds. The animal feed supplements and animal feed compositions described herein comprise one or more bioflavonoids. For example, the animal feed supplements and animal feed compositions may comprise two or more bioflavonoids or three or more bioflavonoids or four or more bioflavonoids or five or more or six or more or seven or more or eight or more or nine or more or ten or more bioflavonoids. For example, the animal feed supplements and animal feed compositions may comprise one, two, three, four or five bioflavonoids. For example, the animal feed supplements and animal feed compositions may comprise two bioflavonoids that may be naringin and neohesperidin. For example, the animal feed supplements and animal feed compositions may comprise five bioflavonoids that may be catechin, rutin, acacetin, genistein and kaempferol. In certain embodiments, the animal feed supplements and animal feed compositions may comprise seven bioflavonoids that may be gallocatechin, catechin gallate, epicatechin, epigallocatechin, epicatechin gallate, kaempferol and quercetin. In certain embodiments, the animal feed supplements and animal feed compositions may comprise nine bioflavonoids that may be gallocatechin, catechin gallate, epicatechin, epigallocatechin, epicatechin gallate, gallocatechin gallate, epigallocathecin gallate, kaempferol and quercetin.

The one or more phenolic compounds, for example the one or more bioflavonoids, may, for example, be obtained from a part of a plant (e.g. fruit or vegetable). For example, flavonols may be obtained from tomatoes, beans, almonds and/or turnips. For example, flavan-3-ols may be obtained from peaches, plums, strawberries and/or green tea. For example, flavones may be obtained from watermelon and/or peppers. For example, flavonones may be obtained from a *Citrus* species fruit. For example, anthocyanidins may be obtained from blueberries, bananas, strawberries, cranberries and/or plums.

The one or more phenolic compounds, for example the one or more bioflavonoids, may, for example, be obtained from a *Citrus* species fruit such as oranges, lemons, grapefruit, pomelo or limes. In particular, the one or more phenolic compounds, for example the one or more bioflavonoids, may be obtained from oranges.

The one or more phenolic compounds, for example the one or more bioflavonoids, may, for example, be obtained from a *Punica* species fruit such as pomegranate (*Punica granatum*) or Socotra pomegranate (*Punica protopunica*). In particular, the one or more phenolic compounds, for example the one or more bioflavonoids, may be obtained from pomegranates (*Punica granatum*).

The one or more phenolic compounds, for example the one or more bioflavonoids, may, for example, be obtained from a part (e.g. leaves) of a *Camellia* species plant such as *Camellia sinensis, Camellia taliensis, Camellia oleifera, Camellia assimilis, Camellia azalea, Camellia brevistyla, Camellia caudata, Camelllia chekiangoleosa, Camellia chrysantha, Camellia chrysanthoides, Camellia connata, Camellia crapnelliana, Camellia cuspidata, Camellia euphlebia, Camellia euryoides, Camellia flava, Camellia fleuryi, Camellia forrestii, Camellia fraterna, Camellia furfuracea, Camellia gilbertii, Camellia granthamiana, Camellis grijsii, Camellia hengchunensis, Camellia hiemalis, Camellia hongkongensis, Camellia irrawadiensis, Camellia japonica, Camellia kissii, Caemllia lutchuensis, Camellia miyagii, Camellia nitidissima, Camellis nokoensis, Camellia parviflora, Camellia pitardii, Camellia pleurocarpa, Camellia polyodonta, Camellia pubupetala, Camellia reticulata, Camellia rosiflora, Camellia rusticana, Camellia salicifolia, Camellia saluenensis, Camellia sasanqua, Camellia semiserrata, Camellis trasnokoensis, Camellia tsaii, Camellia tunghinensis, Camellia vietnamensis, Camelliaxwilliamsii* and *Camellia yunnanensis*. In particular, the one or more bioflavonoids may be obtained from *Camellis sinensis* (tea plant). Any subspecies or variety of *Camellia sinensis* may be used. The part of the *Camellia sinensis* (e.g. leaves) may be untreated or may be treated, for example, by steaming, withering, rolling, oxidation, fermentation and/or drying. The one or more phenolic compounds, for example the one or more bioflavonoids, may, for example, be obtained from green tea (*Camellia sinensis*) leaves.

For example, the one or more phenolic compounds, for example the one or more bioflavonoids, may be obtained from an extract of a *Citrus* species fruit, a *Punica* species fruit or a part of a *Camellia* species plant. The term extract encompasses aqueous extracts, non-aqueous extracts, alcoholic extracts, concentrates, oils, macerations, powders, granules and combinations of two or more thereof. For example, the one or more phenolic compounds, for example the one or more bioflavonoids, may be obtained from dried *Citrus* fruit, dried *Punica* fruit or dried *Camellia* plant parts (e.g. leaves). For example, the one or more phenolic compounds, for example the one or more bioflavonoids, may be obtained from raw *Citrus* fruit, raw *Punica* fruit or raw *Camellia* plant parts (e.g. leaves).

The one or more phenolic compounds, for example the one or more bioflavonoids, may or may not be isolated and/or purified before incorporation into the animal feed supplement and animal feed compositions described herein. As such, in certain embodiments the animal feed supplement or animal feed compositions described herein may comprise raw *Citrus* fruit, dried *Citrus* fruit and/or *Citrus* fruit extracts, or raw *Punica* fruit, dried *Punica* fruit and/or *Punica* fruit extract, or raw *Camellia* plant, dried *Camellia* plant and/or *Camellia* plant extracts.

In other embodiments, the one or more phenolic compounds, for example the one or more bioflavonoids, may each independently be chemically synthesized.

In certain embodiments, the animal feed supplements and animal feed compositions described herein comprise two phenolic compounds, for example two bioflavonoids. The ratio of the first phenolic compound to the second phenolic compound, for example the first bioflavonoid to the second bioflavonoid, may, for example, range from about 0.5:5 to about 3:1. For example, the ratio of the first phenolic compound to the second phenolic compound, for example the first bioflavonoid to the second bioflavonoid, may range from about 0.5:5 to about 2.5:1 or from about 0.5:5 to about 2:1 or from about 0.5:5 to about 1.5:1 or from about 0.5:5 to about 1:1. For example, the ratio of the first phenolic compound to the second phenolic compound, for example the first bioflavonoid to the second bioflavonoid, may range from about 1:5 to about 3:1 or from about 1.5:5 to about 3:1 or from about 2:5 to about 3:1 or from about 2.5:5 to about 3:1 or from about 3:5 to about 3:1 or from about 3.5:5 to about 3:1 or from about 4:5 to about 3:1 or from about 4.5:5 to about 3:1 or from about 5:5 to about 3:1.

In certain embodiments, the animal feed supplements and animal feed compositions described herein comprise naringin and neohesperidin. The ratio of the naringin to neohesperidin may, for example, range from about 0.5:5 to about 3:1. For example, the ratio of naringin to neohesperidin may range from about 0.5:5 to about 2.5:1 or from about 0.5:5 to about 2:1 or from about 0.5:5 to about 1.5:1 or from about 0.5:5 to about 1:1. For example, the ratio of naringin to neohesperidin may range from about 1:5 to about 3:1 or from about 1.5:5 to about 3:1 or from about 2:5 to about 3:1 or from about 2.5:5 to about 3:1 or from about 3:5 to about 3:1 or from about 3.5:5 to about 3:1 or from about 4:5 to about 3:1 or from about 4.5:5 to about 3:1 or from about 5:5 to about 3:1.

In certain embodiments, the ratio of total organosulfur compounds to total phenolic compounds (for example the ratio of total organosulfur compounds to total bioflavonoids) ranges from about 16:1 to about 1:30. For example, the ratio of total organosulfur compounds to total phenolic compounds (for example the ratio of total organosulfur compounds to total bioflavonoids) may range from about 15:1 to about 1:30 or from about 14:1 to about 1:30 or from about 13:1 to about 1:30 or from about 12:1 to about 1:30 or from about 10:1 to about 1:30 or from about 16:1 to about 1:16. For example, the ratio of total organosulfur compounds to total phenolic compounds (for example the ratio of total organosulfur compounds to total bioflavonoids) may range from about 9:1 to about 1:25 or from about 8:1 to about 1:20 or from about 7:1 to about 1:15 or from about 6:1 to about 1:10 or from about 5:1 to about 1:8 or from about 4:1 to about 1:7 or from about 3:1 to about 1:6 or from about 2:1 to about 1:5 or from about 1:1 to about 1:4. For example, the ratio of total organosulfur compounds to total phenolic compounds (for example the ratio of total organosulfur compounds to total bioflavonoids) may range from about 1:1 to about 1:3 or from about 2:1 to about 1:4. For example, the ratio of total organosulfur compounds to total phenolic compounds (for example the ratio of total organosulfur compounds to total bioflavonoids) may be about 1:3.

In certain embodiments, the ratio of allicin to total phenolic compounds (for example the ratio of total organosulfur compounds to total bioflavonoids) ranges from about 16:1 to about 1:30. For example, the ratio of allicin to total phenolic compounds (for example the ratio of total organosulfur compounds to total bioflavonoids) may range from about 15:1 to about 1:30 or from about 14:1 to about 1:30 or from about 13:1 to about 1:30 or from about 12:1 to about 1:30 or from about 10:1 to about 1:30 or from about 16:1 to about 1:16. For example, the ratio of allicin to total phenolic compounds (for example the ratio of allicin to total bioflavonoids) may range from about 9:1 to about 1:25 or from about 8:1 to about 1:20 or from about 7:1 to about 1:15 or from about 6:1 to about 1:10 or from about 5:1 to about 1:8 or from about 4:1 to about 1:7 or from about 3:1 to about 1:6 or from about 2:1 to about 1:5 or from about 1:1 to about 1:4. For example, the ratio of allicin to total phenolic compounds (for example the ratio of total organosulfur compounds to total bioflavonoids) may range from about 1:4 to about 1:8 or from about 1:1 to about 1:3 or from about 2:1 to about 1:4. For example, the ratio of allicin to total phenolic compounds (for example the ratio of total organosulfur compounds to total bioflavonoids) may be about 1:6 or may be about 1:3.

The animal feed supplement may, for example, comprise other components in addition to the active material such as, for example, flavourings, colourants, stabilizers, antioxidants, buffers, emulsifiers, dispersants, thickeners, solubilising agents, micronutrients (for example selenium), vitamins, other feed material (for example carbohydrates such as sugars and starches), soluble and insoluble fibres, cellulose, lignocellulose, cereal grains, cereal brans, grain middlings, grain husks, fruit and vegetable seeds, skins, peels, and the like.

Animal Feed Composition

The animal feed supplement disclosed herein (including all embodiments and any combination of embodiments) may be combined with an animal feed to form an animal feed composition.

The animal feed may, for example, be any composition suitable for providing nutrition to an animal, particularly a ruminant animal. For example, the animal feed may be suitable for any ruminant animal, for example cows, goats, sheep, yaks, deer or antelope. For example, the animal feed may be suitable for any pseudo-ruminant animal, for example, camels and hippopotami. For example, the animal feed may be suitable for any monogastric animal, for example kangaroos, rats, dogs, pigs, cats, horses, birds (such as pigeons, penguins) and rabbits. For example, the animal feed may be suitable for monogastric herbivores such as kangaroos, horses and rabbits.

The animal feed may be solid (e.g. powder, granules, pellets), semi-solid (e.g. gel, ointment, cream, paste) or liquid (e.g. solutions, suspensions, emulsions). The animal feed supplement may independently be solid, semi-solid (e.g. gel, ointment, cream, paste) or liquid (e.g. solutions, suspensions, emulsions). For example, the animal feed and animal feed supplement may both be liquid or both be semi-solid or both be solid. Alternatively, the animal feed and animal feed supplement may each be a different physical state. For example, the animal feed may be solid or semi-solid and the animal feed supplement may be liquid. The animal feed supplement may, for example, be used to "top-dress" (added on top) a ruminant feedlot ration or may be used to blend into a total mixed ration. The animal feed supplement may, for example, be added to the drinking water of the animal. In certain embodiments, the animal feed supplement may be added to the drinking water of the animal immediately before ingestion, for example up to 1 hour before ingestion or up to 30 minutes before ingestion or up to 15 minutes before ingestion or up to 5 minutes before ingestion.

The three main types of animal feed include roughages, concentrates and mixed feeds. In general, roughages contain a high percentage of crude fibre and a low percentage of digestible nutrients. For example, roughages may be defined as containing equal to or greater than 20 wt % crude fibre and equal to or less than 60 wt % total digestible nutrients. Roughages may include, for example, dry roughages (e.g. hay, straw, artificially dehydrated forages containing at least 90 wt % dry matter), silages (formed from green forages such as grass, alfalfa, sorghum and corn and preserved in a silo at dry matter contents of 20 to 50%), and pastures (e.g. green growing pastures providing forage that has a high water content and only 20 to 30% dry matter). The two basic types of roughages include grasses and legumes. Grasses are generally higher in fibre and dry matter than legumes. Legumes are generally higher in proteins, energy, vitamins and minerals.

Concentrates are the opposite of roughages and contain a low percentage of crude fibre and a high percentage of digestible nutrients. For example, concentrates may be defined as containing less than 20 wt % crude fibre and greater than 60 wt % total digestible nutrients. Concentrates may include, for example, energy-rich grains and molasses. Corn, oats, barley and milo (sorghum grain) are energy-rich grains, containing about 70 to 80 wt % total digestible nutrients. Concentrates also include, for example, wheat bran, rice bran, wheat middlings, rye middlings and rice polish.

Mixed feeds are generally a mixture of roughages and concentrates to provide "complete" balanced rations and may be either high or low in energy, protein or fibre.

The at least one organosulfur compound and at least one phenolic compound (e.g. at least one bioflavonoid) may, for example, be combined with animal feed in various amounts depending on the total amount of organosulfur compound(s) and phenolic compound(s) (e.g. bioflavonoid(s)) that are intended to be administered to the animal. For example, the total amount of organosulfur compound(s) and phenolic compound(s) (e.g. bioflavonoid(s)) may be enough such that up to 10 grams total organosulfur compound(s) and phenolic compounds (e.g. bioflavonoid(s)) may be administered to one animal per day.

The concentration of total organosulfur compounds present in the animal feed supplements or animal feed compositions described herein may, for example, be higher than the concentration of each respective organosulfur compound naturally found in *Allium* spp.

The animal feed composition may, for example, comprise from about 0.0001 wt % to about 10 wt % of total organosulfur compounds, based on the total dry weight of the animal feed composition. The animal feed composition may, for example, comprise from about 0.3 wt % to about 10 wt % of total organosulfur compounds, based on the total dry weight of the animal feed composition. For example, the animal feed composition may comprise from about 0.1 wt % to about 9.5 wt % or from about 0.4 wt % to about 9.5 wt % or from about 0.5 wt % to about 9 wt % or from about 0.6 wt % to about 8.5 wt % or from about 0.7 wt % to about 8 wt % or from about 0.8 wt % to about 7.5 wt % or from about 0.9 wt % to about 7 wt % or from about 1 wt % to about 6 wt % or from about 1.5 wt % to about 5.5 wt % or from about 2 wt % to about 5 wt % or from about 2.5 wt % to about 4.5 wt % or from about 3 wt % to about 4 wt % total organosulfur compounds based on the total dry weight of the animal feed composition.

The animal feed composition may, for example, comprise from about 0.0001 wt % to about 10 wt % of allicin, based on the total dry weight of the animal feed composition. The animal feed composition may, for example, comprise from about 0.3 wt % to about 10 wt % of allicin, based on the total dry weight of the animal feed composition. For example, the animal feed composition may comprise from about 0.001 wt % to about 9.5 wt % or from about 0.005 wt % to about 9 wt % or from about 0.01 wt % to about 8.5 wt % or from about 0.05 wt % to about 8 wt % or from about 0.1 wt % to about 7.5 wt % or from about 0.9 wt % to about 7 wt % or from about 1 wt % to about 6 wt % or from about 1.5 wt % to about 5.5 wt % or from about 2 wt % to about 5 wt % or from about 2.5 wt % to about 4.5 wt % or from about 3 wt % to about 4 wt % allicin based on the total dry weight of the animal feed composition. For example, the animal feed composition may comprise from about 0.4 wt % to about 9.5 wt % or from about 0.5 wt % to about 9 wt % or from about 0.6 wt % to about 8.5 wt % or from about 0.7 wt % to about 8 wt % or from about 0.8 wt % to about 7.5 wt % or from about 0.9 wt % to about 7 wt % or from about 1 wt % to about 6 wt % or from about 1.5 wt % to about 5.5 wt % or from about 2 wt % to about 5 wt % or from about 2.5 wt % to about 4.5 wt % or from about 3 wt % to about 4 wt % allicin based on the total dry weight of the animal feed composition.

The concentration of total phenolic compounds (e.g. total bioflavonoids) present in the animal feed supplements or animal feed compositions described herein may, for example, be higher than the concentration of each respective phenolic compound (e.g. each respective bioflavonoid) naturally found in plants or *Citrus* fruit or *Punica* fruit or *Camellia* plants or plant parts.

The animal feed composition may, for example, comprise from about 0.0001 wt % to about 10 wt % total phenolic compounds (e.g. total bioflavonoids), based on the total dry weight of the animal feed composition. The animal feed composition may, for example, comprise from about 0.1 wt % to about 10 wt % total phenolic compounds (e.g. total bioflavonoids), based on the total dry weight of the animal feed composition. For example, the animal feed composition may comprise from about 0.001 wt % to about 10 wt % or from about 0.005 wt % to about 10 wt % or from about 0.01 wt % to about 9.5 wt % or from about 0.05 wt % to about 9 wt % or from about 0.1 wt % to about 8.5 wt % or from about 0.7 wt % to about 8 wt % or from about 0.8 wt % to about 7.5 wt % or from about 0.9 wt % to about 7 wt % or from about 1 wt % to about 6 wt % or from about 1.5 wt % to about 5.5 wt % or from about 2 wt % to about 5 wt % or from about 2.5 wt % to about 4.5 wt % or from about 3 wt % to about 4 wt % total phenolic compounds (e.g. total bioflavonoids) based on the total dry weight of the animal feed composition. For example, the animal feed composition may comprise from about 0.2 wt % to about 10 wt % or from about 0.3 wt % to about 10 wt % or from about 0.4 wt % to about 9.5 wt % or from about 0.5 wt % to about 9 wt % or from about 0.6 wt % to about 8.5 wt % or from about 0.7 wt % to about 8 wt % or from about 0.8 wt % to about 7.5 wt % or from about 0.9 wt % to about 7 wt % or from about 1 wt % to about 6 wt % or from about 1.5 wt % to about 5.5 wt % or from about 2 wt % to about 5 wt % or from about 2.5 wt % to about 4.5 wt % or from about 3 wt % to about 4 wt % total phenolic compounds (e.g. total bioflavonoids) based on the total dry weight of the animal feed composition.

The animal feed composition may, for example, further comprise other animal feed supplements including, for example, vitamins, minerals, antibiotics, growth stimulants and combinations thereof. For example, the animal feed composition may comprise other biologically active animal feed supplements, for example suitable for reducing methane production/emissions and/or increasing availability of nutrients to the animal. The vitamin may be any one or more of vitamin A, vitamin D, vitamin E, vitamin K, thiamine, riboflavin, pyridoxine, cyanocobalamin, carotenoids (including beta-carotene, zeaxanthin, lutein and lycopene), niacin, folic acid, pantothenic acid, biotin, vitamin C, choline, inositol, and salts and derivatives thereof. The mineral may be any one or more of calcium, phosphorous, magnesium, iron, zinc, manganese, copper, cobalt, boron, iodine, sodium, potassium, molybdenum, selenium, chromium, fluorine and chloride. The animal feed composition may, for example, comprise from about 0.001 wt % to about 5 wt % of each additional animal feed supplement or from about 0.01 wt % to about 5 wt % or from about 0.1 wt % to about 5 wt % of each additional animal feed supplement.

The animal feed composition may, for example, comprise other components in addition to the active materials such as, for example, flavourings, colourants, stabilizers (such as rosemary), buffers, emulsifiers, dispersants, thickeners, solubilising agents, micronutrients (for example selenium), antioxidants (for example vitamins such as Vitamin C, Vitamin E), feed materials (for example carbohydrates) and the like.

Uses

The animal feed supplements and animal feed compositions described herein (including all embodiments and combinations of embodiments) may be used to reduce methane production and/or emission by animals, increase availability of nutrients to animals and/or increase and/or increase efficiency of milk and/or meat and/or wool production by animals. Without wishing to be bound by theory, it is believed that the animal feed supplements or animal feed composition may reduce methane production by microbes in the gut of the animals, thus reducing the nutrients used by those microbes and increasing the availability of the nutrients to the animal.

In certain embodiments, the animal is a ruminant animal. Ruminant animals include, for example, cows, goats, sheep, yaks, deer or antelope. In certain embodiments, the animal is a pseudo-ruminant animal. Pseudo-ruminant animals include, for example, camels and hippopotami. In certain embodiments, the animal is a monogastric animal. Monogastric animals include, for example, kangaroos, rats, dogs, pigs, cats, horses, birds (such as pigeons and penguins) and rabbits. In certain embodiments, the animal is a monogastric herbivore. Monogastric herbivores include, for example, kangaroos, horses and rabbits.

The animal feed supplements and animal feed compositions described herein may be administered orally to the animal. The animal feed supplements and animal feed compositions described herein may, for example, be administered daily to the animal.

The amount of the animal feed supplement and/or animal feed composition administered to or consumed by the animal may vary depending on the requirements of the animal and severity of methane production by the animal. The total daily amount of the animal feed supplement and/or animal feed composition administered to or consumed by the animal is, for example, from about 100 g to about 1000 g per day or from about 300 g to about 700 g per day or from about 400 to about 500 g per day. This amount may vary depending on the requirements of the animal and severity of methane production by the animal. For example, the amount of the animal feed supplement and/or animal feed composition administered to or consumed by the animal may vary depending on the type of animal, size of animal, age of animal and/or gut microbiome of the subject. Determination of the proper amount for a particular subject is within the skill of the art. The total daily amount may be divided and administered in portions during the day if desired (e.g. two portions or three portions per day). In general, a suitable daily dose of active agents will be that amount which is the lowest dose effective to produce the desired effect. Increasing the amount of the active agents (allicin and phenolic compound(s) such as bioflavonoid(s)) administered to/consumed by the animal may, for example, decrease the amount of methane production.

Each animal may, for example, consume up to about 10 grams of total organosulfur compounds and phenolic compound(s) per day. For example, each animal may consume up to about 9 grams or up to about 8 grams or up to about 7 grams or up to about 6 grams or up to about 5 grams or up to about 4 grams or up to about 3 grams or up to about 2 grams of total organosulfur compounds and phenolic compound(s) per day. Each animal may, for example, consume at least about 0.5 grams of total organosulfur compounds and phenolic compound(s) per day. For example, each animal may consume at least about 1 gram or at least about 1.5 gram of total organosulfur compounds and phenolic compound(s) per day.

The animal feed supplement described herein may, for example, reduce methane production and/or emissions by at least about 20% (compared to methane production and/or emission if the animal feed supplement was not consumed). For example, the animal feed supplement may reduce methane production and/or emissions by at least about 25% or at least about 30% or at least about 35% or at least about 40% or at least about 45% or at least about 50%. The animal feed supplement described herein may, for example, reduce methane production and/or emissions by up to 100%. For example, the animal feed supplement may reduce methane production and/or emissions by up to about 99% or up to about 98% or up to about 97% or up to about 96% or up to about 95% or up to about 90% or up to about 85% or up to about 80% or up to about 75% or up to about 70%. This may, for example, be measured by the Hohenheim gas test described in the examples below.

The animal feed supplement described herein may, for example, increase milk and/or meat and/or wool production by at least about 20% (compared to milk and/or meat and/or wool production if the animal feed supplement was not consumed). For example, the animal feed supplement may increase milk and/or meat and/or wool production by at least about 25% or at least about 30% or at least about 35% or at least about 40% or at least about 45% or at least about 50%. The animal feed supplement described herein may, for example, increase milk and/or meat and/or wool production by up to 100%. For example, the animal feed supplement may increase milk and/or meat and/or wool production by up to about 95% or up to about 90% or up to about 85% or up to about 80% or up to about 75% or up to about 70%. This may be measured, for example, by volume of milk produced per day or by weight of animal or by weight of wool.

The animal feed supplement described herein may, for example, increase efficiency of milk and/or meat and/or wool production by at least about 20% (compared to efficiency of milk and/or meat and/or wool production if the animal feed supplement was not consumed). For example, the animal feed supplement may increase efficiency of milk and/or meat and/or wool production by at least about 25% or at least about 30% or at least about 35% or at least about 40% or at least about 45% or at least about 50%. The animal feed supplement described herein may, for example, increase efficiency of milk and/or meat and/or wool production by up to 100%. For example, the animal feed supplement may increase efficiency of milk and/or meat and/or wool production by up to about 95% or up to about 90% or up to about 85% or up to about 80% or up to about 75% or up to about 70%. Efficiency relates to the degree to which a particular biological process (e.g. milk, meat, wool production) takes place per unit of nutrition consumed. This may be measured, for example, by change in volume of milk produced per day or weight of animal or weight of wool divided by the total nutrients consumed by the animal.

The animal feed supplement described herein may, for example, increase nutrient availability by at least about 20% (compared to milk and/or meat and/or wool production if the animal feed supplement was not consumed). For example, the animal feed supplement may increase nutrient availability by at least about 25% or at least about 30% or at least about 35% or at least about 40% or at least about 45% or at least about 50%. The animal feed supplement described herein may, for example, increase nutrient availability by up to 100%. For example, the animal feed supplement may increase nutrient availability by up to about 95% or up to about 90% or up to about 85% or up to about 80% or up to about 75% or up to about 70%. Nutrient availability refers to the amounts of nutrients that are available to the animal to be used for biological/metabolic functions.

In certain embodiments, the organosulfur compound(s) (e.g. allicin) and phenolic compound(s) such as bioflavonoid(s) present in the animal feed supplement or composition may act synergistically to reduce methane production, increase nutrient availability and/or increase meat and/or milk and/or wool production. The synergistic combination of organosulfur compound(s) (e.g. allicin) and at least one phenolic compound (e.g. at least one bioflavonoid) delivers an effect that is greater than the sum of the effect by the individual organosulfur compound(s) and phenolic compound components (e.g. bioflavonoid components) on their own and thus can provide an improved performance.

Methods of Manufacture

The animal feed supplements described herein may be made by combining one or more organosulfur compound(s) and one or more phenolic compound(s) (e.g. one or more bioflavonoid(s)). The animal feed compositions described herein may be made by combining an animal feed with one or more organosulfur compound(s) and one or more phenolic compound(s) (e.g. one or more bioflavonoid(s)). The components are combined in suitable amounts to obtain a composition having the desired quantity of each component. Each component may be combined with one or more other components in any order and combination suitable to obtain the desired product. For example, each component may be combined by mixing or blending. For example, the one or more organosulfur compound(s) and one or more phenolic compound(s) (e.g. one or more bioflavonoid(s)) may be combined with an animal feed by placing the one or more organosulfur compound(s) and one or more phenolic compound(s) (e.g. one or more bioflavonoid(s)) on top of the animal feed (top-dressing). Such methods are well known in the art. The composition may be prepared in the dry solid form, for example, powder form, and subject to further processing step depending on the types of the formulation for the intended finished products. The methods may further comprise a forming step, wherein the mixture is moulded, pressed, spray dried or otherwise formed into a shape (e.g. bar, ball, pellet, clusters, tablet), preferably with dimensions and/or textures suitable for consumption by an animal of the types described herein. The methods may comprise housing the animal feed or animal feed supplement in a specific delivery device such as a syringe. The method may comprise forming animal feed supplement or animal feed into a bolus tablet that may be intended to stay in the stomach of the animal (e.g. rumen of the ruminant animal).

The animal feed supplements described herein may be packaged in a protective packaging material, such as Flexible Intermediate Bulk Container (FIBC), woven bags, paper bags, aluminium bags or polyethylene bags. In certain embodiments, the animal feed supplements are packaged in a watertight and/or an airtight material in a box or vacuum-packed. In some embodiments, the animal feed supplements are packed under nitrogen to prevent degradation by oxygen.

The invention will now be described in detail by way of reference only to the following non-limiting examples.

EXAMPLES

Example 1

The in vitro Hohenheim gas test (HGT) including the preparation of all buffers and reagents was carried out according to the protocol of Menke and Steingass (1988), "Menke K. H., Steingass H., Estimation of the energetic feed value obtained from chemical analysis and gas production using rumen fluid, Anim. Res. Dev. 28, 7-55", the contents of which are incorporated herein by reference.

Briefly, ruminal fluid was strained through four layers of gauze (1 mm pore size, type 17 MedPro, Novamed AG, Flawil, Switzerland), before being mixed with preheated, reduced Menke buffer (Menke and Steingass, 1988). The ruminal fluid/buffer mixture was then dispensed into pre-warmed incubation units containing the respective test additives. Each airtight syringe unit contained 25 ml of a ruminal fluid/buffer mixture (1:3; v/v), 300 mg dried and ground total mixed ration (TMR) and 50 ml of the test substrate prepared to give a desired concentration $ml^{-1}$. Each test substrate and controls were tested in six replicates, with each run including a substrate control (rumen fluid plus 300 mg dried and ground substrate of the total mixed ration (TMR) fed to the fistulated sheep from which the ruminal fluid was obtained). Each substrate was also tested on different days to allow for variability in the microbial community. This mixture was incubated for 8 hours at a constant temperature of 39° C. After 8 hours, total gas and liquid volumes were recorded from the calibrated scale printed on the incubation units and fermentation was terminated by decanting only the incubation liquid from the incubation units while fermentation gas was left inside. Then 150 ml of gas was drawn from the incubation units with a Hamilton syringe (Hamilton, AG, Bonaduz, Switzerland) through a gas-tight septum covering the second outlet of the modified units. The main constituents of the flavonoid mix were naringin and neohesperidin at a ratio of 2.10:0.92. Monensin, a polyether antibiotic isolated from *Streptomyces cinnamonensis*, was used as a positive control.

Fermentation gas was analysed on a Hewlett Packard gas chromatograph (model 5890 Series II, Avondale, PA, USA) for methane concentration. For the analysis of the volatile fatty acids (VFA), samples were prepared according to the method of Doane et al. (1998) and determined by HPLC (LaChrom, L-7000 series, Hitachi Ltd., Tokyo, Japan) following the protocol of Ehrlich et al. (1981). Reduction in methane emission results in accumulation of $H_2$, which leads to the decreases of acetate:propionate ratio and acetate:butyrate ratio. This decreased ratio indicates an increase in propionate and butyrate (as formation of propionate and butyrate uses up the $H_2$). The increase in propionate would then result in an increase of meat productivity in ruminants, while the increase in butyrate results in an increase of milk productivity in ruminants.

The results are shown in Tables 1 and 2 below.

TABLE 1.

| Test Composition | Concentration of test composition (μg/ml) | Average Methane Concentration (%) (First Run) | Percentage of Control (First Run) | Average Methane Concentration (%) (Second Run) | Percentage of Control (Second Run) | Average Reduction (%) |
|---|---|---|---|---|---|---|
| Allicin/Flavonoid Mix | 132 μg/ml (33 μg/ml Allicin Pure Equivalent 99 μ/ml Flavonoid Pure Equivalent) | 2.31 | 19 | 3.43 | 26 | 77 |
| Control Substrate | N/A | 12.25 | 100 | 13.10 | 100 | 0 |
| Control Substrate + Carrier (water) | N/A | 11.55 | 94 | 12.67 | 97 | 4 |
| Flavonoid Mix Only | 99 μg/ml Flavonoid Pure Equivalent | 12.14 | 99 | 12.91 | 99 | 1 |
| Monensin | 98.8 μg/ml | 8.89 | 73 | 9.71 | 74 | 27 |

TABLE 2

| Test Composition | Concentration of Test Composition (μg/ml) | Acetate:Propionate Ratio | Acetate:Butyrate Ratio | Propionate Percentage of Control (%) | Butyrate Percentage of Control (%) |
|---|---|---|---|---|---|
| Allicin/Flavonoid Mix | 132 μg/ml (33 μg/ml Allicin Pure Equivalent 99 μg/ml Flavonoid Pure Equivalent) | 1.58:1 | 0.12:1 | 123 | 131 |
| Control Substrate | N/A | 2.05:1 | 0.17:1 | 100 | 100 |
| Control Substrate + Carrier (water) | N/A | 2.05:1 | 0.17:1 | 100 | 103 |
| Flavonoid Mix Only | 99 μg/ml Flavonoid Pure Equivalent) | 2:1 | 0.17:1 | 102 | 105 |
| Monensin | 98.8 μg/ml | 1.58:1 | 0.15:1 | 116 | 73 |

Example 2

The in vitro Hohenheim gas test (HGT) was used to measure average reduction in methane using a composition comprising allicin and a green tea extract and a composition comprising allicin and a pomegranate extract. The green tea and pomegranate extracts were purchased from Ethical Natural Inc. (USA).

A composition comprising allicin and the flavonoid mix used in Example 1 was also tested. Monensin, a polyether antibiotic isolated from *Streptomyces cinnamonensis*, was used as a positive control.

The results are shown in Tables 3 and 4 below.

TABLE 3

| Test Composition | Concentration of test composition (μg/ml) | Average Methane Concentration (%) (First Run) | Percentage of Control (First Run) | Average Methane Concentration (%) (Second Run) | Percentage of Control (Second Run) | Average Reduction (%) |
|---|---|---|---|---|---|---|
| Allicin/Green Tea (1:3) | 132 μg/ml (33 μg/ml Allicin Pure Equivalent 99 μg/ml Total Flavonoid | 4.1 | 33 | 3.4 | 27 | 70 |

TABLE 3-continued

| Test Composition | Concentration of test composition (μg/ml) | Average Methane Concentration (%) (First Run) | Percentage of Control (First Run) | Average Methane Concentration (%) (Second Run) | Percentage of Control (Second Run) | Average Reduction (%) |
|---|---|---|---|---|---|---|
| Allicin/Green Tea (1:1) | 132 μg/ml (66 μg/ml Allicin Pure Equivalent 66 μg/ml Total Flavonoid extracted from Green Tea) | 2 | 16 | 0.5 | 4 | 90 |
| Allicin/Green Tea (3:1) | 132 μg/ml (99 μg/ml Allicin Pure Equivalent 33 μg/ml Total Flavonoid extracted from Green Tea) | 0.3 | 2 | 0.7 | 6 | 96 |
| Allicin/Green Tea (16:1) | 132 μg/ml (124 μg/ml Allicin Pure Equivalent 8 μg/ml Total Flavonoid extracted from Green Tea) | 0.4 | 3 | 0.6 | 5 | 96 |
| Allicin/Flavanoid Mix (1:3) | 132 μg/ml (33 μg/ml Allicin Pure Equivalent 99 μg/ml Total Flavonoid Pure Equivalent) | 3.6 | 29 | 3 | 24 | 73 |
| Monensin | 98.8 μg/ml | 8.2 | 66 | 9.9 | 80 | 27 |

TABLE 4.

| Test Composition | Concentration of test composition (μg/ml) | Average Methane Concentration (%) (First Run) | Percentage of Control (First Run) | Average Methane Concentration (%) (Second Run) | Percentage of Control (Second Run) | Average Reduction (%) |
|---|---|---|---|---|---|---|
| Allicin/Pomegranate (1:3) | 132 μg/ml (33 μg/ml Allicin Pure Equivalent 99 μg/ml Total Flavonoid extracted from Pomegranate) | 1.6 | 13 | 1.9 | 18 | 85 |
| Allicin/Pomegranate (1:1) | 132 μg/ml (66 μg/ml Allicin Pure Equivalent 66 μg/ml Total Flavonoid extracted from Pomegranate) | 0.1 | 1 | 0.1 | 1 | 99 |
| Allicin/Pomegranate (3:1) | 132 μg/ml (99 μg/ml Allicin Pure Equivalent 33 μg/ml Total Flavonoid extracted from Pomegranate) | 0.1 | 1 | 0.1 | 1 | 99 |
| Allicin/Pomegranate (16:1) | 132 μg/ml (124 μg/ml Allicin Pure Equivalent 8 μg/ml Total Flavonoid extracted from Pomegranate) | 0.7 | 6 | 0.3 | 3 | 96 |

TABLE 4.-continued

| Test Composition | Concentration of test composition (μg/ml) | Average Methane Concentration (%) (First Run) | Percentage of Control (First Run) | Average Methane Concentration (%) (Second Run) | Percentage of Control (Second Run) | Average Reduction (%) |
|---|---|---|---|---|---|---|
| Allicin/Flavanoid Mix (1:3) | 132 μg/ml (33 μg/ml Allicin Pure Equivalent 99 μ/ml Flavonoid Pure Equivalent) | 1.3 | 11 | 2 | 19 | 85 |
| Monensin | 98.8 μg/ml | 8.1 | 67 | 7.1 | 66 | 33 |

The invention claimed is:

1. A method of using a supplement in feeding a ruminant animal, the method comprising:
administering the supplement to the ruminal animal in feed for the ruminant animal, the supplement including allicin and a combination of naringin and neohesperidin, wherein a ratio of naringin to neohesperidin is from 0.5:5 to 3:1, a ratio of allicin to the combination of naringin and neohesperidin is from 16:1 to 1:30, the administering of the supplement directly and detectably reduces methane production in the ruminant animal, and such combination of allicin, naringin, and neohesperidin is synergistic compared to administration of an identical composition that lacks any of allicin, naringin, or neohesperidin.

2. The method of claim 1, wherein the supplement further includes alliin, allylpropyl disulfide, diallyl trisulfide, s-allylcysteine, vinyldithiines, and diallyl disulfide.

3. The method of claim 1, wherein the supplement further includes a non-bioflavonoid phenolic compound independently selected from phenolic acid, hydroxycinnamic acids, coumarins, stilbenoids, anthraquinones, lignans, lignins, tannins, polyphenolic proteins, and polyphenols.

4. The method of claim 1, wherein the supplement further includes at least one phenolic compound independently selected from the group consisting of eriocitrin, isonaringin, naringenin, hesperidin, roifolin, diosmin, didymin, hesperetin, poncirin, catechin, rutin, acacetin, genistein, kaempferol, quercetin, epicatechin, gallocatechin, epigallocatechin, catechin gallate, epicatechin gallate, epigallocatechin gallate, gallocatechin gallate, coumaric acid, cinnamic acid, gallic acid, elagic acid, protocathechic acid, chlorogenic acid, caffeic acid, ferullic acid, punicalagin, and punicalin.

5. The method of claim 1, wherein the supplement further includes catechin, rutin, acacetin, genistein, kaempferol, coumaric acid, cinnamic acid, gallic acid, elagic acid, protocathechuic acid, chlorogenic acid, caffeic acid, ferullic acid, punicalagin, punicalin, or combinations thereof.

6. The method of claim 1, wherein the supplement further includes gallocatechin, catechin gallate, epicatechin, epigallocatechin, epigallocatechin, epicatechin gallate, epigallocathecin gallate, kaempferol, quercetin, or combinations thereof.

7. The method of claim 1, wherein the naringin and neohesperidin are from a plant of *Citrus* spp.

8. The method of claim 1, wherein the feed comprises from about 0.0001 wt % to about 10 wt % of allicin based on a dry weight of the feed.

9. The method of claim 8, wherein the feed comprises from about 0.0001 wt % to about 10 wt % of the combination of naringin and neohesperidin based on a dry weight of the feed.

10. The method of claim 1, wherein the feed is a concentrate animal feed composition, a roughage animal feed composition, or a mixture thereof.

11. The method of claim 1, wherein the supplement is consumed by a ruminant animal selected from a cow, goat or sheep.

12. The method of claim 1, wherein the supplement further includes at least one phenolic compound independently selected from the group consisting of eriocitrin, isonaringin, naringenin, hesperidin, hesperetin, and poncirin.

13. A method of using a supplement in feeding a ruminant animal, the method comprising:
administering the supplement to the ruminal animal in feed for the ruminant animal, the supplement consisting essentially of allicin and a combination of naringin and neohesperidin, wherein a ratio of naringin to neohesperidin is from 0.5:5 to 3:1, a ratio of allicin to the combination of naringin and neohesperidin is from 16:1 to 1:30, an administration of the allicin with the combination of naringin and neohesperidin directly and detectably reduces methane production in the ruminant animal, and such combination of allicin, naringin, and neohesperidin is synergistic compared to administration of an identical composition that lacks any of allicin, naringin, or neohesperidin.

14. The method of claim 1, wherein a reduction of the methane production in the ruminant animal is a result of a combination of the allicin, naringin, and neohesperidin.

15. A method of using a supplement in feeding a ruminant animal, the method comprising: administering the supplement to the ruminal animal in feed for the ruminant animal, the supplement including allicin and a combination of naringin and neohesperidin wherein a ratio of naringin to neohesperidin is from 0.5:5 to 3:1, a ratio of allicin to the combination of naringin and neohesperidin is from 16:1 to 1:30, and the administering of the supplement directly and detectably reduces methane production in the ruminant animal at a level that is not observed upon administration of an otherwise identical composition that lacks any of allicin, naringin, or neohesperidin.

16. The method of claim 15, wherein the naringin and neohesperidin are from a plant of *Citrus* spp.

17. The method of claim 15, wherein the feed is a concentrate animal feed composition, a roughage animal feed composition, or a mixture thereof.

18. The method of claim 15, wherein the supplement is consumed by a ruminant animal selected from a cow, goat or sheep.

* * * * *